United States Patent
Tsafnat et al.

(10) Patent No.: US 7,043,756 B2
(45) Date of Patent: May 9, 2006

(54) METHOD AND APPARATUS FOR DETECTING DENIAL-OF-SERVICE ATTACKS USING KERNEL EXECUTION PROFILES

(75) Inventors: Guy Tsafnat, San Jose, CA (US); Cheuk W. Ko, San Jose, CA (US); Paul C. Brutch, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 1027 days.

(21) Appl. No.: 09/965,907

(22) Filed: Sep. 27, 2001

(65) Prior Publication Data

US 2003/0061513 A1    Mar. 27, 2003

(51) Int. Cl.
G06F 11/30  (2006.01)
G06F 15/16  (2006.01)

(52) U.S. Cl. ......................................... 726/23; 709/224
(58) Field of Classification Search .................. 726/22, 726/23
See application file for complete search history.

(56) References Cited

U.S. PATENT DOCUMENTS

| | | | |
|---|---|---|---|
| 6,370,648 B1 * | 4/2002 | Diep | 726/22 |
| 6,487,666 B1 * | 11/2002 | Shanklin et al. | 726/23 |
| 6,681,331 B1 * | 1/2004 | Munson et al. | 726/23 |
| 6,708,212 B1 * | 3/2004 | Porras et al. | 709/224 |
| 6,711,615 B1 * | 3/2004 | Porras et al. | 709/224 |
| 6,742,123 B1 * | 5/2004 | Foote | 726/22 |
| 6,792,546 B1 * | 9/2004 | Shanklin et al. | 726/23 |
| 6,851,061 B1 * | 2/2005 | Holland et al. | 726/23 |
| 2006/0031933 A1 * | 2/2006 | Costa et al. | 726/22 |

OTHER PUBLICATIONS

Munson et al, "Software Reliability as a Function of User Execution Profiles", 1999, Proceedings of the 32nd Hawaii International Conference on System Sciences, p. 1-12.*
Pyo et al, "Run-time Detection of Buffer Overflow Attacks without Explicit Sensor Data Objects", 2004, IEEE Proceedings of the International Conference on Information Technology: Coding and Computing, p. 1-5.*
Hussain et al, "A Framework for Classifying Denial of Service Attacks", Aug. 2003, SIGCOMM "03, p. 99-110.*
Kargl et al, "Protecting Web Servers from Distributed Denial of Service Attacks", May 2001, ACM, p. 514-524.*

* cited by examiner

Primary Examiner—Christopher Revak
(74) Attorney, Agent, or Firm—Zilka-Kotab, PC; Christopher J. Hamaty

(57) ABSTRACT

One embodiment of the present invention provides a system that detects denial-of-service attacks by using an execution profile for a kernel of a server computer system. The system produces a run-time execution profile by gathering statistics related to execution of a protocol stack within the kernel, wherein the protocol stack processes packets received from client computer systems. Next, the system compares the run-time execution profile with a normal execution profile, wherein the normal execution profile is representative of execution when the server is not subject to a denial-of-service attack. If the run-time execution profile deviates from the normal execution profile, the system indicates that a denial-of-service attack is taking place.

26 Claims, 4 Drawing Sheets

| AXIS | MAGNITUDE |
|---|---|
| TCP SYN | 1079 |
| TCP ACK | 235 |
| TCP DATA | 300 |
| ICMP ECHO_REQ | 156 |
| ⋮ | |
| OTHER | 1485 |

VECTOR 208

METHOD AND APPARATUS FOR DETECTING DENIAL-OF-SERVICE ATTACKS USING KERNEL EXECUTION PROFILES

BACKGROUND

1. Field of the Invention

The present invention relates to providing security in networked computer systems. More specifically, the present invention relates to a method and apparatus for detecting denial-of-service attacks by gathering and analyzing execution profiles of code within a kernel of a networked computer system.

2. Related Art

The open architecture of the Internet is instrumental in facilitating rapid dissemination of information. By making information available on a single web site, it is instantly accessible from millions of geographically distributed computer systems. Unfortunately, the open architecture of the Internet also makes computer systems vulnerable to attacks launched from any of the millions of computer systems coupled to the Internet.

One common type of attack is a "denial-of-service" attack, in which a large volume of spurious packets are sent from one or more malicious client computer systems to a server computer system. For example, by sending a large number of spurious requests to a web server, the web server can become so overwhelmed that it is unable to service legitimate requests from non-malicious computer systems. Hence, the web server is effectively rendered inoperative.

One method of detecting denial-of-service attacks is to use a network-based intrusion detection system to examine packets as they stream across the network. A network-based intrusion detection system typically operates by looking for signatures of known attacks. Hence, network-based intrusion detection systems do not operate well against unknown denial-of-service attacks that have not been previously encountered.

The limitations of network-based intrusion detection system arise from the fact a network-based intrusion detection system can only obtain limited information regarding how a specific packet is likely to interact with a specific server. In fact, network-based intrusion detection systems are typically unable to determine if a specific packet will be received by a specific server. They are even less likely to be able to determine how a specific packet will interact with a specific server. Hence, a network-based intrusion detection system has a hard time differentiating an unknown denial-of service attack from a high-traffic condition on the network.

What is needed is a method and an apparatus for detecting denial-of-service attacks that does not suffer from the above-listed problems of network-based intrusion detection system.

SUMMARY

One embodiment of the present invention provides a system that detects denial-of-service attacks by using an execution profile for a kernel of a server computer system. The system produces a run-time execution profile by gathering statistics related to execution of a protocol stack within the kernel, wherein the protocol stack processes packets received from client computer systems. Next, the system compares the run-time execution profile with a normal execution profile, wherein the normal execution profile is representative of execution when the server is not subject to a denial-of-service attack. If the run-time execution profile deviates from the normal execution profile, the system indicates that a denial-of-service attack is taking place.

In one embodiment of the present invention, producing the run-time execution profile involves gathering statistics regarding the fraction of time that the server spends executing one or more portions code related to the protocol stack. In a variation on this embodiment, producing the run-time execution profile involves producing a vector indicating a number of times that the server is found to be executing the one or more portions of code related to the protocol stack. In a variation on this embodiment, the one or more portions of code related to the protocol stack include: a portion related to processing TCP SYN requests; a portion related to processing TCP ACKs; a portion related to processing TCP data; a portion related to processing ICMP echo requests; and a portion that is unrelated to the protocol stack.

In one embodiment of the present invention, the system produces the normal execution profile by gathering statistics related to execution of the server when the server is not subject to a denial-of-service attack.

In one embodiment of the present invention, if a denial-of-service attack is detected, the system blocks offending packets from reaching the server.

In one embodiment of the present invention, producing the run-time execution profile involves gathering statistics over a first time window, and subsequently gathering statistics for a subsequent run-time execution profile over a second time window. In a variation on this embodiment, the system gathers statistics for a concurrent execution profile over a concurrent time window that overlaps the first time window and the second time window, so that a denial-of service attack that overlaps the first time window and the second time window can be detected in the concurrent time window.

In one embodiment of the present invention, comparing the run-time execution profile with the normal execution profile involves determining if the run-time execution profile deviates more than a pre-specified amount from the normal execution profile.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Networked Computer System

Figure 1:
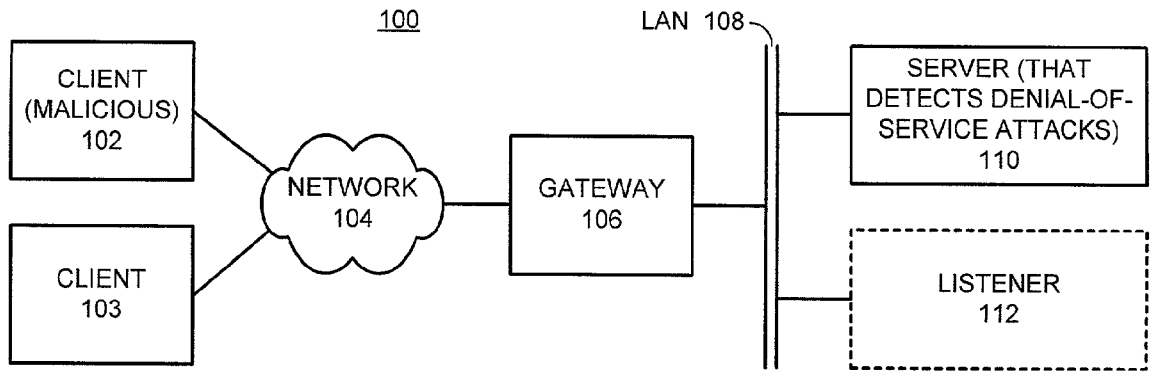
FIG. 1 illustrates a distributed computer system in accordance with an embodiment of the present invention.

FIG. 1 illustrates a distributed computer system 100 in accordance with an embodiment of the present invention. Distributed computer system 100 includes client computer systems 102–103 which communicate with server computer system 110. This communication takes place through network 104, gateway 106 and local area network (LAN) 108.

Clients 102–103 and server 110 can generally include any type of computer system, including, but not limited to, a computer system based on a microprocessor, a mainframe computer, a digital signal processor, a portable computing device, a personal organizer, a device controller, and a computational engine within an appliance. Moreover, clients 102–103 include a mechanism for communicating across network 104, and server 110 includes a mechanism for servicing requests from clients 102–103 for computational and/or data storage resources. Server 110 also includes an internal mechanism for detecting denial-of-service attacks.

Network 104 can generally include any type of wire or wireless communication channel capable of coupling together computing nodes. This includes, but is not limited to, a local area network, a wide area network, or a combination of networks. In one embodiment of the present invention, network 104 includes the Internet. LAN 108 can generally include any local area network or intranet. Gateway 106 can generally include any type of interface that can shield LAN 108 from accesses through network 104. For example, gateway 106 can include a firewall or a router.

Note that the present invention is not limited to distributed computing systems with a client-server architecture. In general, the present invention can be applied to any computer system that receives packets.

Server

Figure 2:
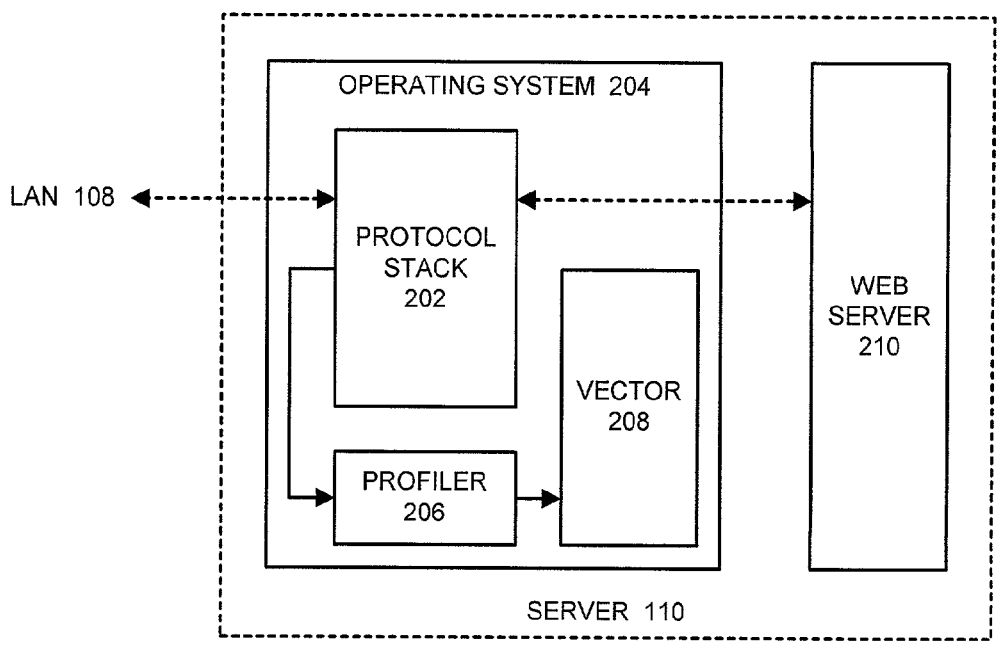
FIG. 2 illustrates the structure of a server computer system in accordance with an embodiment of the present invention.

FIG. 2 illustrates the structure of server 110 in accordance with an embodiment of the present invention. Server 110 includes an operating system 204 that coordinates the execution of applications on server 110. For example, web server 210 is an application that can be executed under control of operating system 204.

Operating system 204 also includes protocol stack 202, which processes packets received across LAN 108. The execution of protocol stack 202 is monitored by profiler 206, which records statistics related to execution of protocol stack 202 in accordance with an embodiment of the present invention. These statistics are recorded in a vector 208.

Protocol Stack

Figures 3, 4:
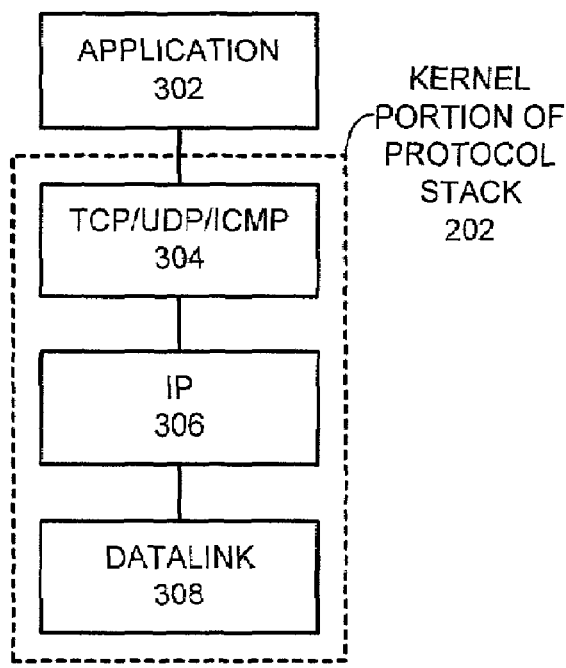
FIG. 3 illustrates the structure of a protocol stack in accordance with an embodiment of the present invention.
FIG. 4 illustrates the structure of a vector for storing an execution profile in accordance with an embodiment of the present invention.

FIG. 3 illustrates the structure of the kernel portion protocol stack 202 in accordance with an embodiment of the present invention. The kernel portion of protocol stack 202 includes datalink layer 308, Internet Protocol (IP) layer 306, TCP/UDP/ICMP layer 304 and application layer 302. Datalink layer 308 handles lower-level processing related transferring data across LAN 108. For example, datalink layer 308 can handle processing related to the Ethernet protocol. IP layer 306 handles processing related to determining which host or hosts are involved in a communication. TCP/UDP/ICMP layer 304 handles processing related to determining which portions of a given host are involved in a communication. Finally, application layer 302 handles processing of an application involved in the communication. For example, application layer 302 can relate to a web server, such as web server 210 illustrated in FIG. 2.

In one embodiment of the present invention, profiler 206 (illustrated in FIG. 2) monitors how much time server 110 spends in code blocks related to datalink layer 308, IP layer 306, TCP/UDP/ICMP layer 304 and application layer 302. Note that TCP refers to Transmission Control Protocol, UDP refers to User Datagram Protocol and ICMP refers to Internet Control Message Protocol.

Execution Profile

FIG. 4 illustrates the structure of vector 208 that contains an execution profile in accordance with an embodiment of the present invention. Vector 208 includes a number of entries, each of which includes an axis field and a magnitude. The axis field identifies a given code block, and the associated magnitude field keeps track of how often server 110 is found to be executing the given code block. In one embodiment of the present invention, profiler 206 periodically determines which code block server 110 is executing, and then increments the corresponding magnitude field for the code block.

For example, referring to vector 208, TCP SYN has a magnitude of 1079 indicating that server 110 was found to be executing code to process a TCP SYN request 1079 times. Furthermore, TCP ACK has a magnitude of 235 indicating that server 110 was found to be executing code to process a TCP ACK request 235 times. Similarly, TCP data has a magnitude of 300 indicating that server 110 was found to be executing code to process TCP data 300 times, and ICMP ECHO_REQ has a magnitude of 156 indicating that server 110 was found to be executing code to service an ICMP echo request data 156 times. Finally, the OTHER field has a corresponding magnitude of 1485, indicating that server 110 was found to be executing code outside of protocol stack 202 1485 times.

Note that the above-described vector 208 is merely exemplary. The present invention can generally be used with any type of structure that keeps track of an execution profile for server 110.

Exemplary Normal Execution Profile

Figure 5:
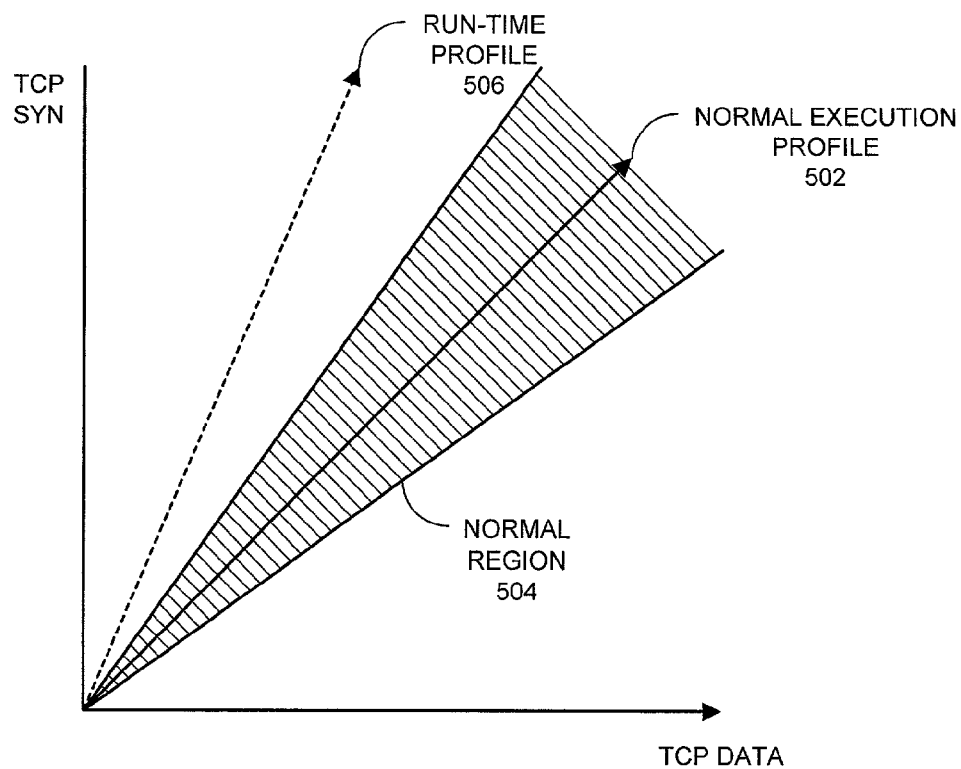
FIG. 5 presents a simple example of a normal execution profile in accordance with an embodiment of the present invention.

FIG. 5 presents an example of a normal execution profile in accordance with an embodiment of the present invention. In order to simplify this example, only the axis for TCP SYN and the axis for TCP DATA are presented. However, the present invention can generally be used with a larger number of axes.

In FIG. 5, a normal execution profile is represented by a vector 502. This normal execution profile is used to define a normal region 504, which surrounds vector 502. Any execution profile that falls outside of normal region 504 causes the system to indicate that a denial-of-service attack is taking place. For example, run-time profile 506 indicates that a higher percentage of TCP SYN processing is taking place relative to TCP data processing. This suggests that a flood of TCP SYN requests are being received and the system is likely to be under a denial-of-service attack based upon TCP SYN requests.

Concurrent Execution Profiles

Figure 6:
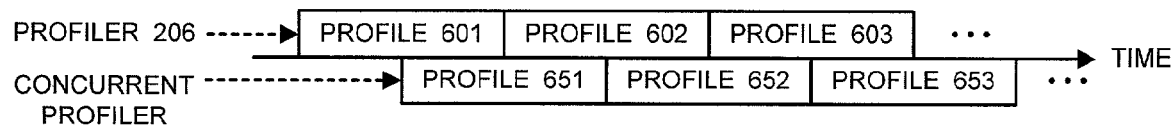
FIG. 6 illustrates how execution profiles can be generated concurrently within overlapping time windows in accordance with an embodiment of the present invention.

FIG. 6 illustrates how execution profiles can be generated concurrently within overlapping time windows in accordance with an embodiment of the present invention. In the top portion of FIG. 6, profiler 206 sequentially generates profiles 601–603 that span adjacent time windows. However, a denial-of-service attack that overlaps profile 601 and profile 602 may not be detected because a portion of the attack will be averaged into profile 601 and another portion of the attack will be averaged into profile 602.

In order to remedy this potential problem, a concurrent profiler 600 can produce a set of concurrent profiles 651–653 that overlap profiles 601–603. This allows more denial-of-service attacks to be detected.

Process of Detecting a Denial-of-Service Attack

Figure 7:
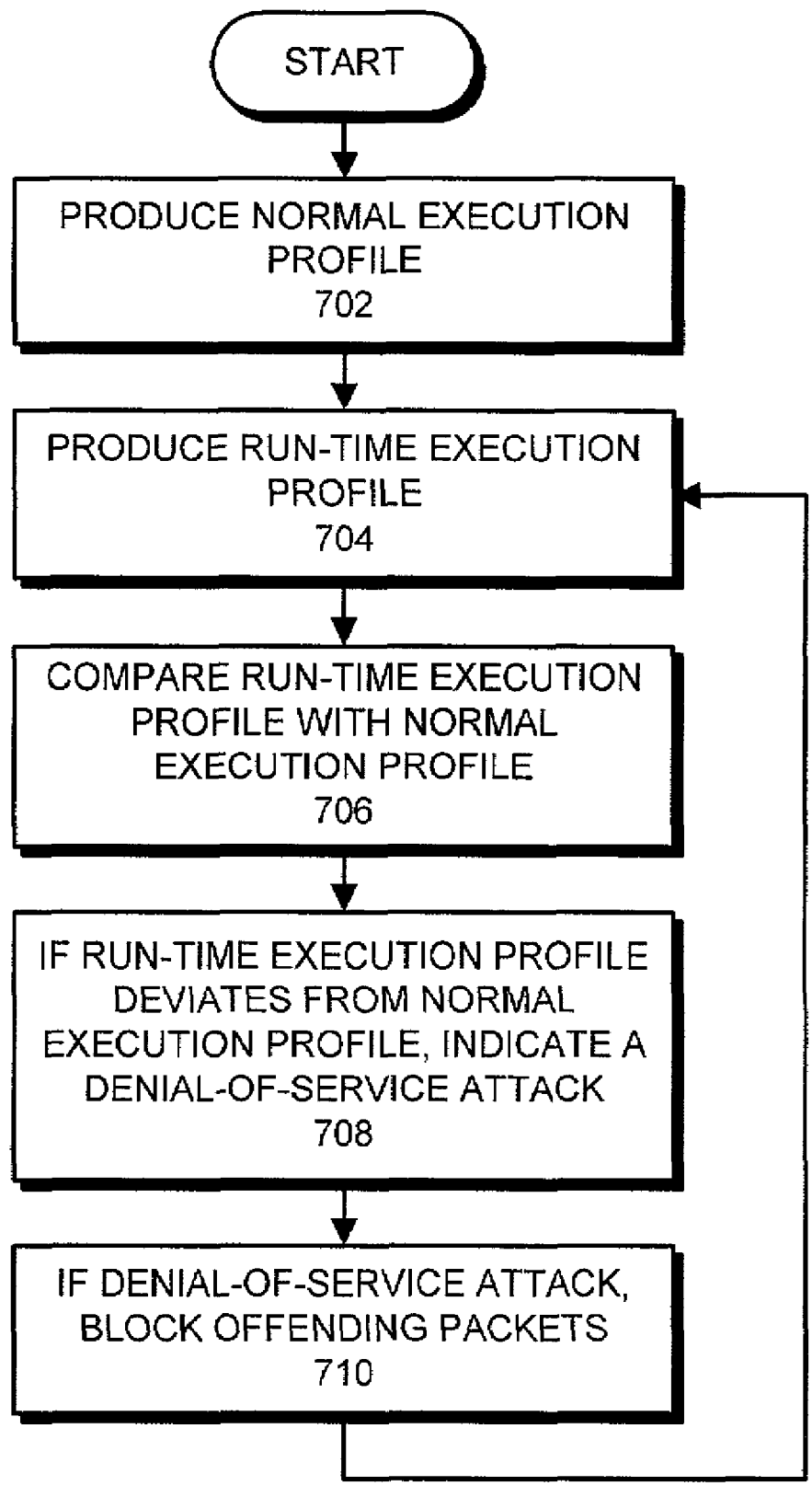
FIG. 7 is a flow chart illustrating the process of detecting a denial-of-service attack through use of an execution profile in accordance with an embodiment of the present invention.

FIG. 7 is a flow chart illustrating the process of detecting a denial-of-service attack through use of an execution profile in accordance with an embodiment of the present invention. The system starts by producing a normal execution profile during periods of execution in which a denial-of-service attack is not taking place (step 702).

Next, the system periodically produces a run-time execution profile for server 110 while server 110 is executing (step 704). The system then compares this run-time execution profile with the normal execution profile (step 706). If the run-time execution profile deviates significantly from the normal execution profile, the system indicates that a denial-of-service attack taking place (step 708). If a denial-of-service attack is taking place, the system can take an action to mitigate the attack, such as blocking offending packets at gateway 106 (step 710).

Note that the present invention is effective in detecting a denial-of-service attack because, during a denial-of-service attack, server 110 is likely to spend larger amounts of time in lower layers of the protocol stack processing lower-level packets typically involved in network-based denial-of-service attacks.

Furthermore, note that the alerts generated by the present invention can be correlated with an output from a network-based intrusion detection system to reduce the number of false alarms produced by the system, and to reduce the number of attacks that are not detected by the system.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting a denial-of-service attack using an execution profile for a kernel of a server computer system, comprising:
   producing a run-time execution profile by gathering statistics related to execution of a protocol stack within the kernel of the server;
   wherein the protocol stack processes packets received from client computer systems;
   comparing the run-time execution profile with a normal execution profile for the kernel of the server;
   wherein the normal execution profile is representative of execution when the server is not subject to a denial-of-service attack; and
   indicating that a denial-of-service attack is taking place if the run-time execution profile deviates from the normal execution profile;
   wherein producing the run-time execution profile involves gathering statistics regarding a fraction of time that the server spends executing one or more portions of code related to the protocol stack.

2. The method of claim 1, wherein producing the run-time execution profile involves producing a vector indicating a number of times that the server is found to be executing the one or more portions of code related to the protocol stack.

3. The method of claim 1, wherein the one or more portions of code related to the protocol stack include:
   a portion related to processing TCP SYN requests;
   a portion related to processing TCP ACKs;
   a portion related to processing TCP data;
   a portion related to processing ICMP echo requests; and
   a portion that is unrelated to the protocol stack.

4. The method of claim 1, further comprising producing the normal execution profile by gathering statistics related to execution of the server when the server is not subject to a denial-of-service attack.

5. The method of claim 1, wherein if a denial-of-service attack is detected, the method further comprises blocking offending packets from reaching the server.

6. The method of claim 1, wherein producing the run-time execution profile involves gathering statistics over a first time window, and subsequently gathering statistics for a subsequent run-time execution profile over a second time window.

7. The method of claim 6, further comprising gathering statistics for a concurrent execution profile over a concurrent time window that overlaps the first time window and the second time window, so that a denial-of service attack that overlaps the first time window and the second time window can be detected in the concurrent time window.

8. The method of claim 1, wherein comparing the run-time execution profile with the normal execution profile involves determining if the run-time execution profile deviates more than a pre-specified amount from the normal execution profile.

9. The method of claim 1, wherein the protocol stack includes a datalink layer, an Internet Protocol layer, a Transmission Control Protocol/User Datagram Protocol/Internet Control Message Protocol layer and an application layer such that the one or more portions of code are associated wit each of the layers.

10. The method of claim 1, wherein producing the normal execution profile involves producing a vector indicating a normal number of times that the server is found to be executing the one or more portions of code related to the protocol stack.

11. A computer-readable storage medium storing instructions that when executed by a computer cause the computer to perform a method for detecting a denial-of-service attack using an execution profile for a kernel of a server computer system, the method comprising:
   producing a run-time execution profile by gathering statistics related to execution of a protocol stack within the kernel of the sewer;
   wherein the protocol stack processes packets received from client computer systems;

comparing the run-time execution profile with a normal execution profile for the kernel of the server;

wherein the normal execution profile is representative of execution when the server is not subject to a denial-of-service attack; and indicating that a denial-of-service attack is taking place if the run-time execution profile deviates from the nonnal execution profile;

wherein producing the run-time execution profile involves gathering statistics regarding a fraction of time that the server spends executing one or more portions code related to the protocol stack.

12. The computer-readable storage medium of claim 11, wherein producing the run-time execution profile involves producing a vector indicating a number of times that the sewer is found to be executing the one or more portions of code related to the protocol stack.

13. The computer-readable storage medium of claim 11, wherein the one or more portions of code related to the protocol stack include:
   a portion related to processing TCP SYN requests;
   a portion related to processing TCP ACKs;
   a portion related to processing TCP data;
   a portion related to processing ICMP echo requests; and
   a portion that is unrelated to the protocol stack.

14. The computer-readable storage medium of claim 11, wherein the method further comprises producing the nonnal execution profile by gathering statistics related to execution of the server when the server is not subject to a denial-of-service attack.

15. The computer-readable storage medium of claim 11, wherein if a denial-of-service attack is detected, the method further comprises blocking offending packets from reaching the server.

16. The computer-readable storage medium of claim 11, wherein producing the run-time execution profile involves gathering statistics over a first time window, and subsequently gathering statistics for a subsequent run-time execution profile over a second time window.

17. The computer-readable storage medium of claim 16, wherein the method further comprises gathering statistics for a concurrent execution profile over a concurrent time window that overlaps the first time window and the second time window, so that a denial-of service attack that overlaps the first time window and the second time window can be detected in the concurrent time window.

18. The computer-readable storage medium of claim 11, wherein comparing the run-time execution profile with the normal execution profile involves determining if the run-time execution profile deviates more than a pre-specified amount from the normal execution profile.

19. A apparatus that detects a denial-of-service attack through use of an execution profile for a kernel of a server computer system, comprising:
   a profiling mechanism that is configured to produce a run-time execution profile by gathering statistics related to execution of a protocol stack within the kernel of the server;

wherein the protocol stack processes packets received from client computer systems;

a comparison mechanism that is configured to compare the run-time execution profile with a normal execution profile for the kernel of the server;

wherein the normal execution profile is representative of execution when the server is not subject to a denial-of-service attack; and wherein the comparison mechanism is configured to indicate that a denial-of-service attack is taking place if the run-time execution profile deviates from the normal execution profile;

wherein the profiling mechanism is configured to gather statistics regarding a fraction of time that the server spends executing one or more portions code related to the protocol stack.

20. The apparatus of claim 19, wherein the profiling mechanism is configured to produce a vector indicating a number of times that the server is found to be executing the one or more portions of code related to the protocol stack.

21. The apparatus of claim 19, wherein the one or more portions of code related to the protocol stack include:
   a portion related to processing TCP SYN requests;
   a portion related to processing TOP ACKs;
   a portion related to processing TOP data;
   a portion related to processing ICMP echo requests; and
   a portion that is unrelated to the protocol stack.

22. The apparatus of claim 19, wherein the profiling mechanism is additionally configured to produce the normal execution profile by gathering statistics related to execution of the server when the server is not subject to a denial-of-service attack.

23. The apparatus of claim 19, further comprising a blocking mechanism that is configured to block offending packets from reaching the server if a denial-of-service attack is detected.

24. The apparatus of claim 19, wherein while producing the run-time execution profile, the profiling mechanism is configured to gather statistics over a first time window, and to subsequently gather statistics for a subsequent run-time execution profile over a second time window.

25. The apparatus of claim 24, wherein the profiling mechanism is additionally configured to gather statistics for a concurrent execution profile over a concurrent time window that overlaps the first time window and the second time window, so that a denial-of service attack that overlaps the first time window and the second time window can be detected in the concurrent time window.

26. The apparatus of claim 19, wherein the comparison mechanism is configured to determine if the run-time execution profile deviates more than a pre-specified amount from the normal execution profile.

* * * * *

UNITED STATES PATENT AND TRADEMARK OFFICE
CERTIFICATE OF CORRECTION

PATENT NO. : 7,043,756 B2                                    Page 1 of 1
APPLICATION NO. : 09/965907
DATED : May 9, 2006
INVENTOR(S) : Tsafnat et al.

It is certified that error appears in the above-identified patent and that said Letters Patent is hereby corrected as shown below:

Claim 11 col. 6, line 65 replace "sewer;" with --server:--;
Claim 11 col. 7, line 7 replace "nonnal" with --normal--;
Claim 11 col. 7, line 16 replace "sewer" with --server--;
Claim 14 col. 7, line 27 replace "nonnal" with --normal--;
Claim 21 col. 8, line 24 replace "TOP" with --TCP--;
Claim 21 col. 8, line 25 replace "TOP" with --TCP--.

Signed and Sealed this

Ninth Day of February, 2010

David J. Kappos
*Director of the United States Patent and Trademark Office*